US011047485B2

(12) United States Patent
Al-Jarallah et al.

(10) Patent No.: US 11,047,485 B2
(45) Date of Patent: Jun. 29, 2021

(54) SEALING A GATE VALVE

(71) Applicant: Saudi Arabian Oil Company, Dhahran (SA)

(72) Inventors: Bader M. Al-Jarallah, Dhahran (SA); Mousa R. Alharbi, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 152 days.

(21) Appl. No.: 16/536,057

(22) Filed: Aug. 8, 2019

(65) Prior Publication Data
US 2021/0041030 A1 Feb. 11, 2021

(51) Int. Cl.
F16K 3/20 (2006.01)
F16K 3/18 (2006.01)
F16K 3/02 (2006.01)

(52) U.S. Cl.
CPC ............ *F16K 3/188* (2013.01); *F16K 3/0254* (2013.01); *F16K 3/0281* (2013.01); *F16K 3/207* (2013.01)

(58) Field of Classification Search
CPC ...... F16K 3/207; F16K 5/0271; F16K 5/0471; F16K 5/0689; F16K 5/168; F16K 5/188; F16K 5/205
USPC ........................................................ 251/172
See application file for complete search history.

(56) References Cited

U.S. PATENT DOCUMENTS 3,273,855 A 9/1966 Wells
3,497,177 A * 2/1970 Hulsey ................. F16K 3/0227
251/172
3,504,885 A * 4/1970 Hulsey ................. F16K 5/0673
251/172
RE29,299 E 7/1977 Estes et al.
4,083,376 A 4/1978 Alaniz
4,280,522 A * 7/1981 Pechnyo ............... F16K 5/0673
137/72

(Continued)

FOREIGN PATENT DOCUMENTS

CN 202371199 8/2012
DE 19544901 A1 * 6/1997 ............. F16K 5/205

(Continued)

OTHER PUBLICATIONS lacier.in' [online], "API 6D valves," Lacier Industries (I), The Valve Company with an Edge, retrieved from URL <https://www.lacier.in/gate/>, retrieved on Jul. 17, 2019, available on or before 2018, 4 pages.

(Continued)

*Primary Examiner* — Martina A Tietjen
(74) *Attorney, Agent, or Firm* — Fish & Richardson P.C.

(57) ABSTRACT

A gate valve system includes a gate valve that has a housing with a first tubular body and a second tubular body separate from the first tubular body. The gate valve has a gate that moves to interrupt or allow fluid flow from the first tubular body to the second tubular body. The system includes a first seat disposed at a first annular reassess and defines an interior channel configured to receive pressurized fluid from a fluid injector. A second seat disposed at a second annular recess defines a second gap with the second annular recess. The second gap receives the pressurized fluid from the interior channel of the first seat to expand the second gap to move toward the surface of the gate to form an emergency seal with the gate as the pressurized fluid expands the second gap.

20 Claims, 5 Drawing Sheets

(56) References Cited

U.S. PATENT DOCUMENTS

| | | | |
|---|---|---|---|
| 4,741,509 A | | 5/1988 | Bunch et al. |
| 5,322,261 A | * | 6/1994 | Aarnes .................... F16K 5/205 |
| | | | 251/159 |
| 5,533,738 A | * | 7/1996 | Hoffmann ............... F16K 5/201 |
| | | | 277/388 |
| 5,624,101 A | * | 4/1997 | Beson .................... F16K 5/201 |
| | | | 251/172 |
| 9,903,483 B2 | | 2/2018 | Liu |
| 2014/0183396 A1 | | 7/2014 | Hunter et al. |
| 2016/0369901 A1 | * | 12/2016 | Lanning ................ F16K 27/067 |
| 2018/0038491 A1 | | 2/2018 | Gaburri et al. |
| 2018/0045324 A1 | * | 2/2018 | Manson .................. F16K 5/201 |
| 2020/0141508 A1 | * | 5/2020 | McGuire ................ F16K 5/205 |

FOREIGN PATENT DOCUMENTS

| | | |
|---|---|---|
| JP | S52136425 | 11/1977 |
| WO | WO 2017158077 | 9/2017 |
| WO | WO 2018236223 | 12/2018 |

OTHER PUBLICATIONS products.slb.com, [online], "GROVE API 6D Fabricated Gate Valve (Small Bore)," Schlumberger, retrieved from URL <https://www.products.slb.com/valves/brands/grove/grove-g4n-gate-valve>, retrieved on Jul. 17, 2019, available on or before 2018, 3 pages.

PCT International Search Report and Written Opinion in International Appln. No. PCT/US2020/045578, dated Oct. 22, 2020, 14 pages.

* cited by examiner

SEALING A GATE VALVE

TECHNICAL FIELD

This disclosure relates to controlling the flow of fluid in pipes.

BACKGROUND

Valves are used in piping systems to close, open, or regulate the flow of fluids in pipes. Some valves are used to form a fluid seal between an inlet of the valve and an outlet of the valve. Forming a fluid seal prevents fluids from leaking across the valve, allowing the valve to interrupt the fluid flow within a pipe.

SUMMARY

Implementations of the present disclosure include a gate valve system. The system includes a gate valve including a housing including a first tubular body and a second tubular body separate from the first tubular body to define a first gap between the first tubular body and the second tubular body. The first tubular body and the second tubular body are configured to flow a fluid from a pipe fluidically coupled to the gate valve. The gate valve further includes a gate configured to move within the first gap to interrupt or allow fluid flow from the first tubular body to the second tubular body. The system also includes a first seat disposed at a first annular recess extending from an inner surface of the first tubular body. The first seat is movable from the first annular recess toward a surface of the gate to form a first fluid seal between the first tubular body and the second tubular body. The first seat defines an interior channel configured to receive pressurized fluid from a fluid injector coupled to the housing. The system also includes a second seat disposed at a second annular recess radially larger than the first annular recess. The second seat includes an inner diameter larger than an outer diameter of the first seat and disposed concentrically about an outer surface of the first seat. The second seat defines a second gap with the second annular recess, the second gap configured to receive the pressurized fluid from the interior channel of the first seat to expand the second gap. The second seat is configured to move toward the surface of the gate to form a second seal with the gate as the pressurized fluid expands the second gap. The second seal is configured to prevent fluid from flowing from the first tubular body to the second tubular body.

In some implementations, the first seat includes an O-ring disposed at the outer surface of the first seat. The O-ring is arranged to form a fluid seal with one of an inner surface of the second seat or a surface of the first annular recess to prevent fluid from flowing in a direction along a width of the first seat.

In some implementations, the fluid injector is fluidically coupled to the interior channel of the first seat, and the second gap is fluidically coupled to the interior channel of the first seat such that the pressurized fluid flows from the fluid injector through the valve housing to the interior channel, and from the interior channel to the second gap to expand the second gap.

In some implementations, the second seat includes a smaller width than the first seat, and the interior channel of the first seat includes 1) a fluid inlet at the outer surface of the first seat, the fluid inlet fluidically coupled to the fluid injector, 2) a first outlet at the second gap, and 3) a third outlet facing the gate.

In some implementations, the second annular recess extends radially away from a surface of the first annular recess to define, together with the first annular recess and in cross-section, an M-shaped annular recess.

In some implementations, the second seat is configured to form the second fluid seal with the gate when fluid leaks at the first seal between the first seat and the gate.

In some implementations, the second seat includes an end defining a first chamfered edge and the second annular recess includes a corresponding second chamfered edge to define, with the first chamfered edge, a V-shaped gap converging away from the interior channel of the first seat. The V-shaped gap is in fluid communication with the interior channel.

In some implementations, the system further includes a lock pin attached to the valve housing. The lock pin includes a first end exposed outside the valve housing and a second end configured to engage a recess of the second seat to prevent the second seat from moving toward the gate. The lock pin is configured to disengage the second seat as the lock pin moves away from the second seat to allow the second seat to move toward the surface of the gate.

In some implementations, the system further includes a third seat similar to the first seat. The third seat is disposed at a third annular recess extending from an inner surface of the second tubular body. The third seat faces the first seat and is configured to form, with the gate, a third fluid seal between the first tubular body and the second tubular body. The system also includes a forth seat similar to the second seat. The fourth seat is disposed at a fourth annular recess radially larger than the third annular recess, the fourth seat facing the second seat and configured to form, with the gate, a fourth fluid seal between the first tubular body and the second tubular body.

In some implementations, the first seat includes a first soft insert disposed within an annular groove of the first seat extending from a surface of the first seat facing the gate, the first soft insert configured to form the first seal with the surface of the gate, and wherein the second seat includes a second soft insert disposed within an annular groove of the second seat extending from a surface of the second seat facing the gate, the second soft insert configured to form the second seal with the surface of the gate.

In some implementations, the fluid injector includes a head adapted to be fluidically coupled to a fluid pump that flows the pressurized fluid to the fluid injector. The fluid injector includes a check valve configured to prevent backward flow of fluid.

In some implementations, the gate is configured to move in a direction perpendicular to a longitudinal axis of the tubular bodies to interrupt or allow fluid flow from the first tubular body to the second tubular body.

Implementations of the present disclosure include a method of forming a secondary fluid seal in a gate valve. The gate valve includes a housing including a first tubular body and a second tubular body separate from the first tubular body to define a first gap between the first tubular body and the second tubular body. The first tubular body and the second tubular body are configured to flow a fluid from a pipe fluidically coupled to the gate valve. The gate valve further includes a gate configured to move within the first gap to interrupt or allow fluid flow from the first tubular body to the second tubular body. The gate valve further includes a first seat disposed at a first annular recess extending from an inner surface of the first tubular body and is configured to form, with the gate, a first fluid seal between the first tubular body and the second tubular body. The first seat defines an interior channel configured to receive pressurized fluid from a fluid injector coupled to the valve housing. The gate valve further includes a second seat disposed at a second annular recess radially larger than the first annular recess. The second seat includes an inner diameter larger than an outer diameter of the first seat and is disposed concentrically about an outer surface of the first seat. The second seat defines a second gap with the second annular recess, the second gap configured to receive the pressurized fluid from the interior channel of the first seat to expand the second gap. The method includes determining that fluid leaks, at an interface between the first seat and the gate, from the first tubular body toward the second tubular body. The method also includes actuating the fluid injector to flow pressurized fluid from the fluid injector, through the interior channel of the first seat, to the second gap between the second seat and the second annular recess to expand the second gap and move the second seat toward the surface of the gate to form a fluid seal, under fluidic pressure, between the first tubular body and the second tubular body.

In some implementations, actuating the fluid injector includes fluidically connecting the fluid injector to a fluid pump and flowing, from the fluid pump to the fluid injector, the pressurized fluid.

In some implementations, the gate valve further includes a lock pin attached to the valve housing. The lock pin includes a first end exposed outside the valve housing and a second end configured to engage a recess of the second seat to prevent the second seat from moving toward the gate. The lock pin is configured to disengage the second seat as the lock pin moves away from the second seat to allow the second seat to move toward the surface of the gate. The method further includes, prior to actuating the fluid injector, disengaging the lock to allow the second seat to move toward the gate.

Implementations of the present disclosure also include a secondary sealing system for a gate valve. The gate valve includes a housing including a first tubular body and a second tubular body separate from the first tubular body to define a first gap between the first tubular body and the second tubular body. The first tubular body and the second tubular body are configured to flow a fluid from a pipe fluidically coupled to the gate valve. The gate valve further includes a gate configured to move within the first gap to interrupt or allow fluid flow from the first tubular body to the second tubular body. The system includes a first seat disposed at a first annular recess extending from an inner surface of the first tubular body. The first seat is movable from the recess toward a surface of the gate to form a first fluid seal between the first tubular body and the second tubular body. The first seat defines an interior channel configured to receive pressurized fluid from a fluid injector coupled to the housing. The system also includes a second seat disposed at a second annular recess radially larger than the first annular recess. The second seat includes an inner diameter larger than an outer diameter of the first seat and is disposed concentrically about an outer surface of the first seat. The second seat defines a second gap with the second annular recess, the second gap configured to receive the pressurized fluid from the interior channel of the first seat to expand the second gap. The second seat is configured to move toward the surface of the gate to form a second seal with the gate as the pressurized fluid expands the second gap. The second seal is configured to prevent fluid from flowing from the first tubular body to the second tubular body.

In some implementations, the fluid injector is fluidically coupled to the interior channel of the first seat. The second gap if fluidically coupled to the interior channel of the first seat such that the pressurized fluid flows from the fluid injector through the valve housing to the interior channel, and from the interior channel to the second gap to expand the second gap.

In some implementations, the system further includes a lock pin attached to the valve housing. The lock pin includes a first end exposed outside the valve housing and a second end configured to engage a recess of the second seat to prevent the second seat from moving toward the gate. The lock pin is configured to disengage the second seat as the lock pin moves away from the second seat to allow the second seat to move toward the surface of the gate.

In some implementations, the system further includes a third seat similar to the first seat. The third seat is disposed at a third annular recess extending from an inner surface of the second tubular body, the third seat facing the first seat and configured to form a third fluid seal between the first tubular body and the second tubular body. The system also includes a forth seat similar to the second seat, the fourth seat disposed at a fourth annular recess radially larger than the third annular recess. The fourth seat faces the second seat and is configured to form a fourth fluid seal between the first tubular body and the second tubular body.

In some implementations, the first seat includes a first soft insert disposed within an annular groove of the first seat extending from a surface of the first seat facing the gate. The first soft insert is configured to form the first seal with the surface of the gate. The second seat includes a second soft insert disposed within an annular groove of the second seat extending from a surface of the second seat facing the gate. The second soft insert is configured to form the second seal with the surface of the gate.

DETAILED DESCRIPTION

The present disclosure relates to using a pair of seats to form a seal in a gate valve (for example, a slab gate valve) in case of an emergency such as when the main sealing seats fail. Gate valves can be used to shut off the flow of fluids in a pipe. A gate valve shuts off the fluid flow by lowering a gate that blocks the fluid path in the pipe. To prevent fluid from leaking across the gate, a pair of main seats can be used to form a fluid seal with the gate valve. A main seat disposed on each side of the gate is pushed against the gate to form a fluid seal with the gate valve. The fluid seal prevents fluid from flowing from an inlet of the gate valve to an outlet of the gate valve. When the main seats lose their tightness or are damaged, fluid can leak through the main seats across the gate, limiting the functionality of the gate valve. To prevent fluid from leaking across the gate, a pair of emergency seats disposed outside the main seats can be used to form an emergency fluid seal with the gate. An emergency seat on each side of the gate is activated on-demand (for example, manually) to seal the fluid path in the gate valve.

Implementations of the present disclosure may realize on or more of the following advantages. For example, when the main seats of a gate valve fail, an emergency pair of seats can form a fluid seal in the gate valve without the need of invasive intervention. In some examples, the emergency pair of seats can form a seal in addition to the main pair of seats to form a double seal that increases the effectiveness of the gate valve.

Figure 1:
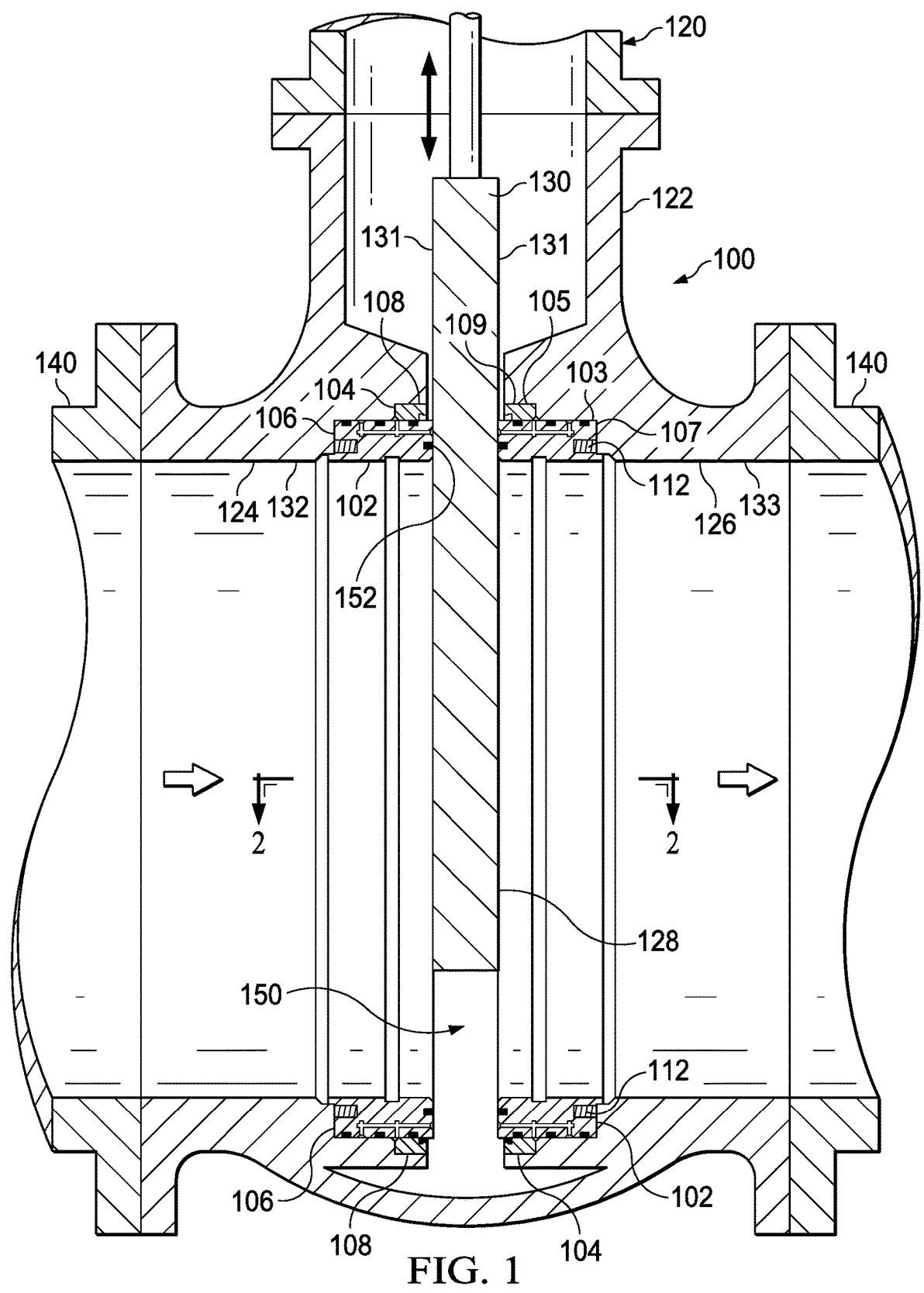
FIG. 1 is a side, cross sectional view of a portion of a gate valve connected to a pipe.

FIG. 1 illustrates a side, cross sectional view of a gate valve secondary sealing system 100. The gate valve system 100 includes a gate valve 120, a first seat 102, a second seat 104, a third seat 103, and a fourth seat 105. The gate valve 120 has a housing 122 (for example, a bonnet) that defines a first tubular body 124 and a second tubular body 126 separate from the first tubular body 124. The first tubular body 124 is separated from the second tubular body 126 to define a first gap 150 (for example, a body cavity) between the tubular bodies. The first tubular body 124 and the second tubular body 126 are part of the housing 122, with the housing 122 joining the first tubular body with the second tubular body 124 through walls of the housing to form a one-piece body. The first tubular body 124 and the second tubular body 126 flow a fluid from a pipe 140 fluidically coupled to the gate valve 120. The gate valve 120 also includes a gate 130 configured to move within the first gap 150 to interrupt or allow fluid flow from the first tubular body 124 to the second tubular body 126 (or in the opposite direction). For example, the gate 130 moves in a direction perpendicular to a longitudinal axis of the pipe 140 to interrupt or allow fluid flow from the first tubular body 124 to the second tubular body 126. The first tubular body 124 has an inlet upstream of the gate 130 and an outlet downstream of the gate 130. Fluid flows into the gate valve 120 through the inlet of the first tubular body 124 and leaves the valve 120 through the outlet of the second tubular body 126. To shut off the fluid flow in pipe 140, the gate 130 is lowered to block the fluid pathway of pipe 140. To prevent leakage of fluid through the lowered gate 130, the pairs of seats can be used to form a fluid seal between the first tubular body 124 and the second tubular body 126. For example, without the seats forming a seal, the fluid flows from the pipe 140 to the first tubular body 124, then passes through the gap or cavity 150 to the second tubular body 126. When the gate valve is fully opened or fully closed, the body cavity or gap 150 can be free of fluid, but when then gate is being moved or when the seats do not form a proper seal, the body cavity receives fluid from the pipe. Thus, when the gate valve is closed or opened, the first seat 102 can be pressed against the gate 130 by the pressure in the line and the spring 260, acting like a couple of brake pads, pushed by a pressure differential.

The gate valve system 100 has a main pair of seats 102 and 103 (for example, the default seats on API-6D gate valves) and a secondary pair of seats 104 and 105 (for example, the emergency pair of seats). The main pair of seats includes the first seat 102 and the third seat 103. The third seat 103 is similar to the first seat 102. The first seat 102 and third seat 103 are concentric rings that face each other and move in opposite directions to form a fluid seal with the gate 130. When the first main seat 102 works properly, the fluid is contained in the upstream side of the gate valve by the first seat 102, and if the fluid is reversed (for example, flowed in the opposite direction), then the third seat 103 forms the primary seal to contain the fluid in the other side of the gate valve. The first seat 102 is disposed at a first annular recess 106 that extends from an inner surface 132 of the first tubular body 124. The first seat 102 is movable from the first annular recess 106 toward a surface 131 of the gate 130 to form, with the gate 130, a first fluid seal 152 at an interface between the seat 102 and the gate 130 (for example, when the gate is stated). The seal prevents fluid (for example, liquid) from flowing between the first tubular body 124 and the second tubular body 126. With the first fluid seal 152 formed, the fluid in the pipe 140 is constrained upstream of the gate 130. Similar to the first seat 102, the third seat 103 is disposed at a third annular recess 107 that extends from an inner surface 133 of the second tubular body 126. The third seat 103 is also movable from the third annular recess 107 toward a surface 131 of the gate 130 to form a fluid seal with the gate opposite the first fluid seal 152.

The secondary pair of seats include a second seat 104 and a fourth seat 105. The fourth seat 105 is similar to the second seat 104. The second seat 104 and fourth seat 105 are concentric rings that face each other and move in opposite directions to form an emergency fluid seal with the gate 130. The second seat 104 is disposed at a second annular recess 108 radially larger than the first annular recess 106. The second annular recess 108 is radially larger than the first annular recess 106 in that a radius of the second annular recess 108 is larger than a radius of the first annular recess 106. For example, the radius of the second annular recess 108 is larger than the radius of the first annular recess 106 by a distance equivalent or similar to a thickness of the second seat 104. The second annular recess 108 extends radially away from a surface of the first annular recess 106 to define, together with the first annular recess 106 and in cross-section, an M-shaped (or staircase shape) annular recess. Similar to the second seat 104, the fourth seat 105 is disposed at a fourth annular recess 109 radially larger than the third annular recess 107. The fourth seat 105 faces the second seat 104 and is movable from its annular recess 109 to form a fourth fluid seal that prevents fluid from flowing between the first tubular body 124 and the second tubular body 126. The fourth seat 105 has an inner diameter larger than an outer diameter of the third seat 103. As further described in detail later with respect to FIG. 3, the second seat 104 and fourth seat 105 are each movable by a pressurized fluid to form an emergency seal with the gate 130

Figure 2:
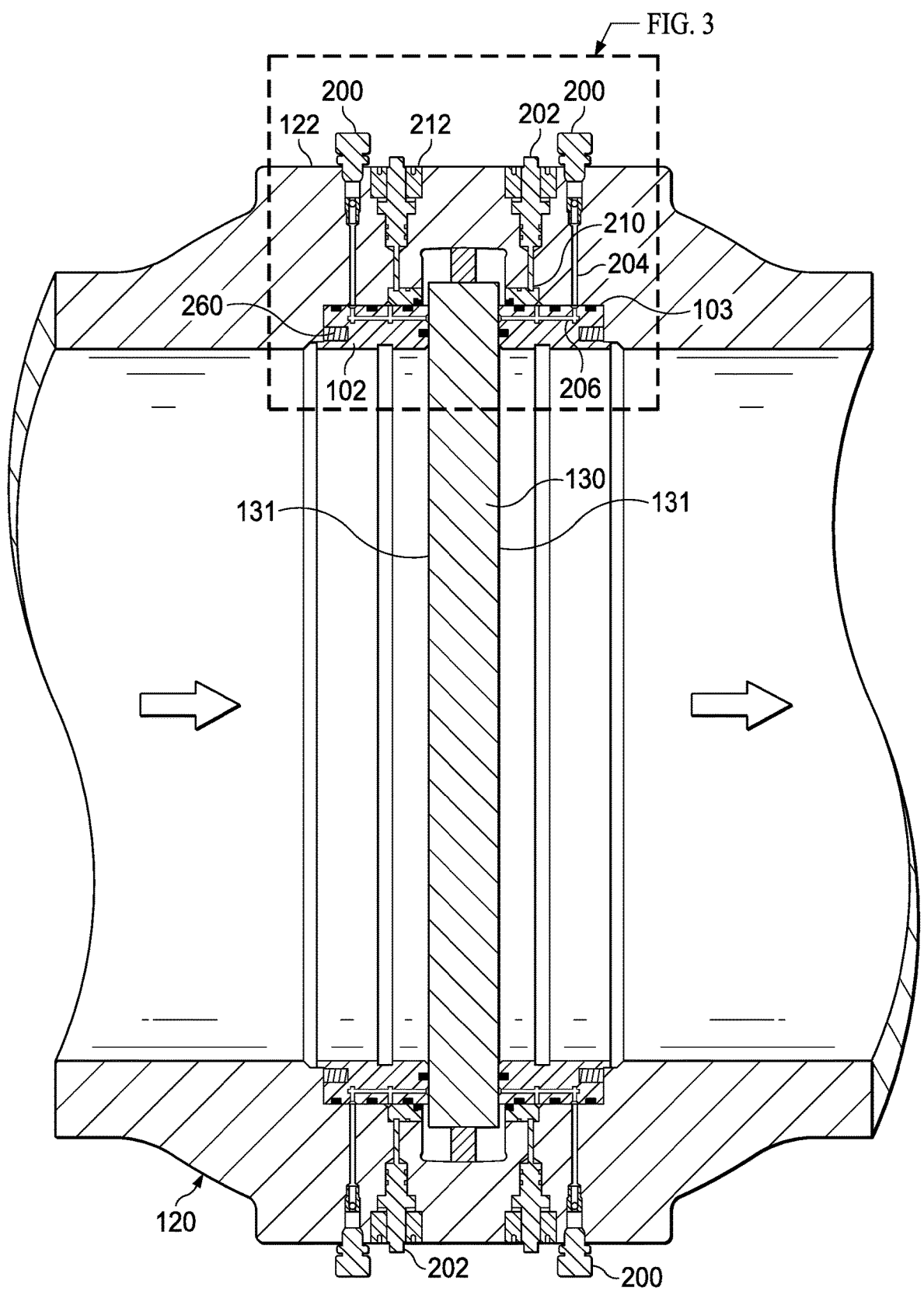
FIG. 2 is a top, cross sectional view of a portion of the gate valve in FIG. 1, taken along line 2-2- in FIG. 1.

FIG. 2 shows a top, cross-sectional view of the gate valve 120. The gate valve 120 has a pair of fluid injectors 200 (for example, injection fittings) on each side of the gate valve, each pair attached to opposite sides of the housing 122 of the gate valve 120. Each fluid injector 200 has an end 210 (for example, a head) that is exposed and an opposite end inside the gate valve 120 configured to push pressurized fluid toward the seats. As described in detail later with respect to FIG. 3, each fluid injector 200 flows pressurized fluid (for example, a sealant or a viscous fluid) to their respective second seat 104 and fourth seat 105 to move the seats toward the gate 130. The first seat 102 (and in some instances the third seat 103) is kept energized against the gate 130 by compression springs 260 such that the soft insert (shown in FIG. 3) contacts the gate to form the fluid seal.

Figure 3:
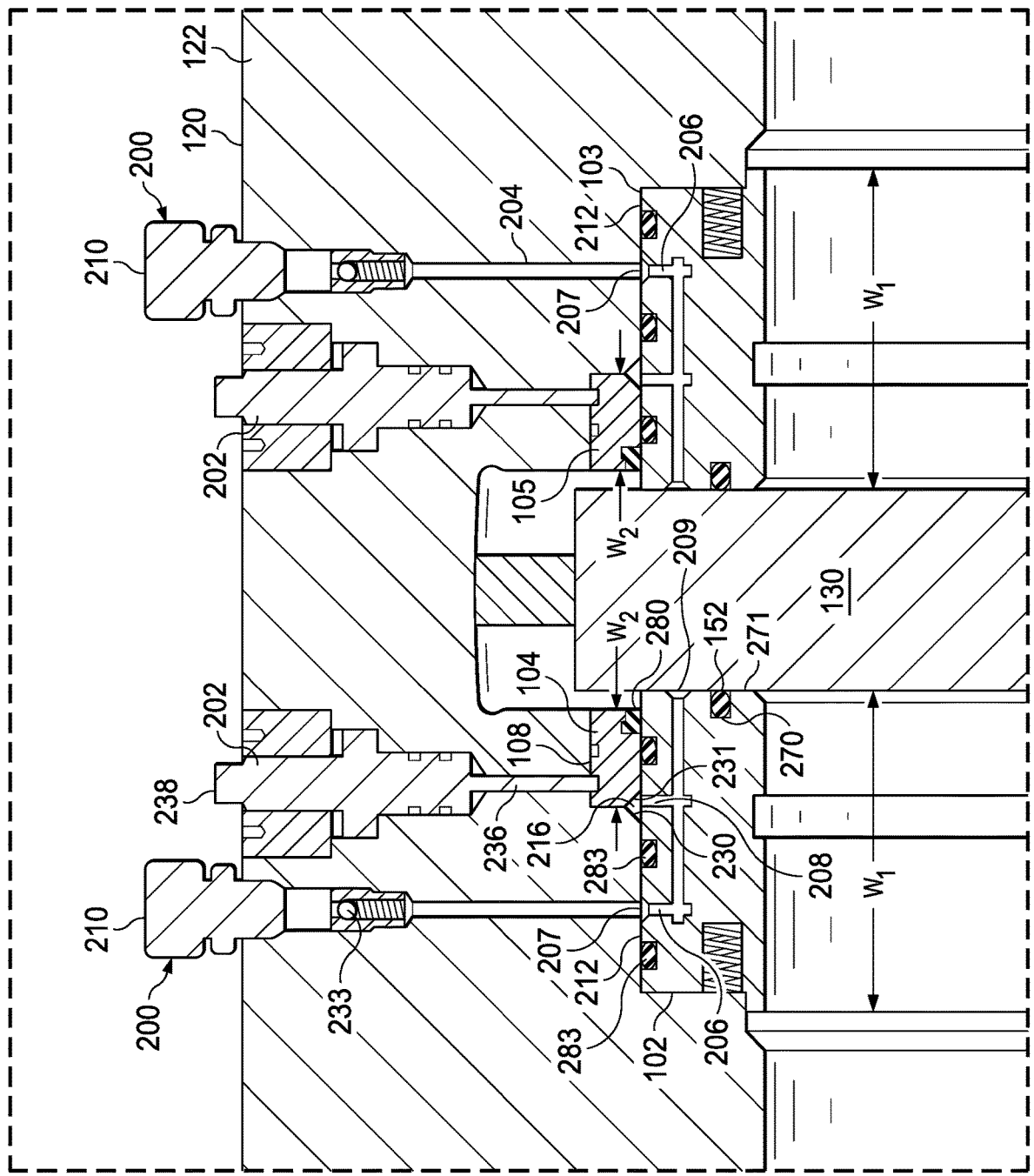
FIG. 3 is detail view of a portion of the gate valve in FIG. 2.

FIG. 3 shows a detail view of the fluid injectors 200 and the configuration of the sealing seats 102, 103, 104, 105. Each injector 200 has a head 210 adapted to engage with or couple to a tool or equipment (for example, a high pressure pump) that injects fluid, through the fluid injectors 200, to the emergency sealing system. The head 210 is exposed outside the housing 122 of the gate valve 120. To actuate the fluid injector 200, a high pressure pump (not shown) is fluidically connected to the head 210 to inject pressurized fluid or a sealant (for example, a grease) to form the emergency seal. After injecting the fluid, the pump can be disconnected. The fluid injector 200 is fitted with an internal check valve 233 that prevents backward flow of fluid. Each fluid injector 200 is fluidically coupled to a respective main seat 102 and 103. Specifically, the first main seat 102 and second main seat 103 each define an interior channel 206 with a fluid inlet 207 aligned with a fluid channel of the fluid injector 200 to receive pressurized fluid from a respective fluid injector 200. The interior channel 206 includes 1) the fluid inlet 207 at the outer surface 212 of the first seat, 2) a first outlet 208 at the second gap 216, and a third outlet 209 facing the gate 130. The third outlet 209 is the main outlet of the fluid injector assembly to form an emergency sealant connection. The third outlet 209 faces the gate 130 and can be used to deliver viscous fluid from the injector 200 to form another emergency temporary seal. In some implementations, the injectors 200 are only utilized on a temporary basis. For example, the viscous fluid is injected through channel 206 to outlet 209 to make a seal, and once the gate is lifted to open the gate valve, the injected sealant is lost.

With respect to the seats 102, 103, 104, and 105, each seat has a width configured to allow each seat to fit within its respective annular recesses. The first seat 102 and third seat 103 each have a width '$w_1$' larger than a width '$w_2$' of the second seat 104 and fourth seat 105. The respective widths are a function of the valve size and pressure rating of the valve. The second seat 104 can have a width '$w_2$' that is around ⅓ of the width '$w_1$' of the first seat 102. The second seat 104 (and fourth seat 105) has an end that defines a first chamfered edge 230 and the second annular recess 108 has a corresponding second chamfered edge 231 to define, with the first chamfered edge 230, a second gap 216 (for example, a V-shaped gap) that converges away from the interior channel 206 of the first seat 102. The gap 216 is aligned and in fluid communication with the fluid outlet 208 of the interior fluid channel 206 to receive pressurized fluid from the interior channel 206. The V-shaped gap can be of a different shape, and is configured to allow fluid to enter the second annular recess 108 to push the second seat 104 toward the gate 130. Thus, the fluid injector 200 is fluidically coupled to the interior channel 206 of the first seat 102, and the second gap 216 if fluidically coupled to the interior channel 206 of the first seat 102 such that pressurized fluid flowed from the fluid injector 200 flows through the valve housing 122 to the interior channel 206, and from the interior channel 206 to the second gap 216. As fluid fills the second gap 216, the second gap 216 expands to push the second seat 104 (when the lock pin 202 is unlatched, as further described later) toward the gate 130. The check valve 233 or a different check valve along the fluid path of the sealant allows the sealant to flow through the outlet 208 into the gap 216 and keep the gap 216 pressurized. The fluid is a high viscous sealant or grease. The grease can be a lubricant composed of a fluid lubricant thickened with a material that contributes a degree of plasticity.

In some implementations, the inner diameter of the second seat 104 is substantially similar to the outer diameter of the first seat 102. Each of the first seat 102 and second seat 104 can have soft inserts 283 or gaskets (for example, O-rings) that prevent ingress from line fluid (for example, fluid from the pipe) and also to keep the injected pressurized fluid contained. For example, the first seat 102 has one or more O-rings disposed at the outer surface 212 of the first seat 102. The O-rings are arranged to form a fluid seal with an inner surface of the second seat 104 or with a surface of its annular recess 106 to prevent fluid from flowing in a direction along the width '$w_1$' of the first seat 102.

The second seat 104 is used to form an emergency seal with the gate 130 when fluid from the pipe leaks at the first seal 152 (for example, at the interface) between the first seat 102 and the gate 130. For example, when leakage from the first seal 152 is detected, a technician can activate the second seat 104 by actuating the fluid injectors 200 (for example, connecting the fluid injectors to a fluid pump) and unlatching the lock pin 202. Seats 102 and 103 fail when the valve (at closed position) passes fluid from the first tubular body to the second tubular body (or in the opposite direction), usually through a bleed point downstream in the piping, or through a cavity bleed. For example, a sensor at the cavity of the gate valve can detect fluid moving from one side of the valve to the other, or fluid flowing at the cavity of the gate valve.

To lock the second seat 104 in place and prevent premature or undesired movement of the second seat 104, a lock pin 202 (for example, a spring loaded lock pin or a screw lock pin) attached to the valve housing 122 can engage the second seat 104 from an outer surface of the second seat 104. For example, the lock pin 202 has a first end 238 exposed outside the valve housing 122 and a second end 236 configured to engage a recess of the second seat 104 to prevent the second seat 104 from moving toward the gate 130. The lock pin 202 disengages the second seat 104 as the lock pin 202 moves away (for example, as the lock pin is pulled up or unscrewed) from the second seat 104 to release the second seat 104 and allow the fluid to expand the second gap 216 to move the second seat 104 toward the surface 131 of the gate 130.

The first seat 102 has a first soft insert 270 (for example, a PTFE soft insert or an O-ring) disposed within an annular groove of the first seat extending from a surface 271 of the first seat 102 facing the gate 130. The first soft insert 270 forms the first seal 152 with the surface 131 of the gate 130. The second seat 104 has a second soft insert 280 disposed within an annular groove of the second seat 104 extending from a surface of the second seat facing the gate 130. The second soft insert 280 forms the second seal with the surface 131 of the gate 130. Specifically, the metal body of the first seat 102 carries the soft insert 270 to form the fluid seal because the metal body of the seat 102 cannot create a proper fluid seal with the gate 130.

Figure 4:
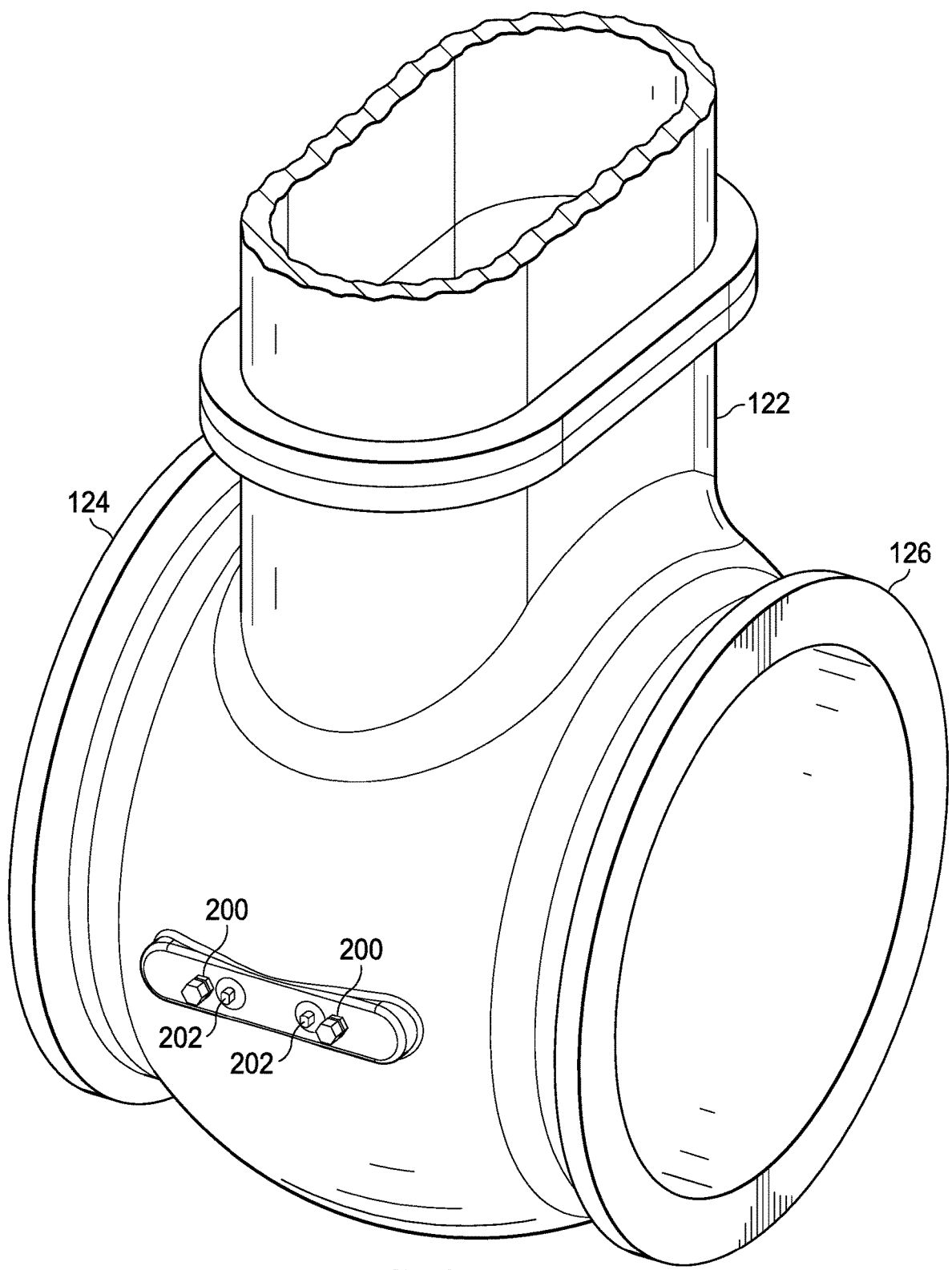
FIG. 4 is a perspective view of a portion of the gate valve in FIG. 1.

FIG. 4 shows a perspective view of a portion of the gate valve 120. Referring also to FIG. 1, the housing 122 of the gate valve 100 has a first pair of fluid injectors 200 and a first pair of lock pints 202 on a front side of the gate valve, and a second pair (not shown) of fluid injectors and a second pair (not shown) of lock pins on a back side of the gate valve. Each pair of fluid injectors 200 includes an injector disposed upstream of the gate 130 (see FIG. 1) and a fluid injector disposed downstream of the gate 130. Similarly, each pair of the lock pins 202 includes a lock pin disposed upstream of the gate 130 and a lock pin disposed downstream of the gate 130. Each of the lock pins 202 has a head exposed outside the valve housing 122 adapted to receive a tool to apply torque (for example, a screwdriver) to engage and disengage their respective emergency seats 104 and 105. For example, each lock pin 202 can be screwed in to engage its respective emergency seat and screwed out to disengage its respective emergency seat. After the corresponding emergency seat 104 is disengaged from lock pin 202, pressurized fluid injected through a fluid injector 200 moves the respective emergency seat against the gate to form an emergency fluid seal. Generally, only the fluid injectors upstream of the gate are used to make the emergency seal. For example, depending on the direction of the flow, the seat or seats upstream of the gate are used to form the fluid seal while the seat or seats downstream of the gate are not moved toward the gate by a fluid injector.

Figure 5:
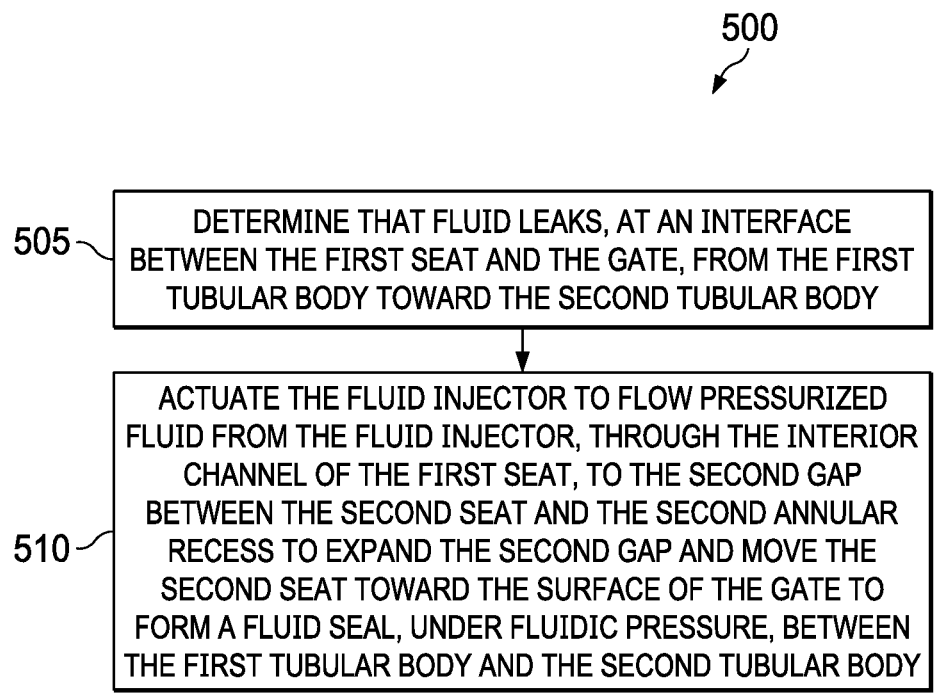
FIG. 5 shows a flow chart of an example method of forming a secondary fluid seal in a gate valve.

FIG. 5 shows a flow chart of an example method of forming a secondary fluid seal in a gate valve. The gate valve has a housing that includes a first tubular body and a second tubular body separate from the first tubular body to define a first gap between the first tubular body and the second tubular body. The first tubular body and the second tubular body are configured to flow a fluid from a pipe fluidically coupled to the gate valve. The gate valve also includes a gate configured to move within the first gap to interrupt or allow fluid flow from the first tubular body to the second tubular body. The gate valve has a first seat disposed at a first annular recess that extends from an inner surface of the first tubular body. The first seat is configured to form a first fluid seal between the first tubular body and the second tubular body. The first seat defines an interior channel that receives pressurized fluid from a fluid injector coupled to the valve housing. The gate valve also has a second seat disposed at a second annular recess radially larger than the first annular recess. The second seat has an inner diameter larger than an outer diameter of the first seat. The second seat is disposed concentrically about an outer surface of the first seat. The second seat defines a second gap with the second annular recess. The second gap receives the pressurized fluid from the interior channel of the first seat to expand the second gap. The method includes determining that fluid leaks, at an interface between the first seat and the gate, from the first tubular body toward the second tubular body (505). The method also includes actuating the fluid injector to flow pressurized fluid from the fluid injector, through the interior channel of the first seat, to the second gap between the second seat and the second annular recess to expand the second gap and move the second seat toward the surface of the gate to form a fluid seal, under fluidic pressure, between the first tubular body and the second tubular body (510).

Although the following detailed description contains many specific details for purposes of illustration, it is understood that one of ordinary skill in the art will appreciate that many examples, variations and alterations to the following details are within the scope and spirit of the disclosure. Accordingly, the exemplary implementations described in the present disclosure and provided in the appended figures are set forth without any loss of generality, and without imposing limitations on the claimed implementations. For example, the implementations are described with reference to a gas turbine. However, the disclosure can be implemented with any rotary equipment that includes a rotating shaft or rotor that needs to be aligned with a rotating shaft or rotor of another rotary equipment.

Although the present implementations have been described in detail, it should be understood that various changes, substitutions, and alterations can be made hereupon without departing from the principle and scope of the disclosure. Accordingly, the scope of the present disclosure should be determined by the following claims and their appropriate legal equivalents.

The singular forms "a", "an" and "the" include plural referents, unless the context clearly dictates otherwise.

As used in the present disclosure and in the appended claims, the words "comprise," "has," and "include" and all grammatical variations thereof are each intended to have an open, non-limiting meaning that does not exclude additional elements or steps.

As used in the present disclosure, terms such as "first" and "second" are arbitrarily assigned and are merely intended to differentiate between two or more components of an apparatus. It is to be understood that the words "first" and "second" serve no other purpose and are not part of the name or description of the component, nor do they necessarily define a relative location or position of the component. Furthermore, it is to be understood that that the mere use of the term "first" and "second" does not require that there be any "third" component, although that possibility is contemplated under the scope of the present disclosure.

We claim:

1. A gate valve system comprising:
a gate valve comprising a housing comprising a first tubular body and a second tubular body separate from the first tubular body to define a first gap between the first tubular body and the second tubular body, the first tubular body and the second tubular body configured to flow a fluid from a pipe fluidically coupled to the gate valve, the gate valve further comprising a gate configured to move within the first gap to interrupt or allow fluid flow from the first tubular body to the second tubular body;
a first seat disposed at a first annular recess extending from an inner surface of the first tubular body, the first seat movable from the first annular recess toward a surface of the gate to form a first fluid seal between the first tubular body and the second tubular body, the first seat defining an interior channel configured to receive pressurized fluid from a fluid injector coupled to the housing; and
a second seat disposed at a second annular recess radially larger than the first annular recess, the second seat comprising an inner diameter larger than an outer diameter of the first seat and disposed concentrically about an outer surface of the first seat, the second seat defining a second gap with the second annular recess, the second gap configured to receive the pressurized fluid from the interior channel of the first seat to expand the second gap, the second seat configured to move toward the surface of the gate to form a second seal with the gate as the pressurized fluid expands the second gap, the second seal configured to prevent fluid from flowing from the first tubular body to the second tubular body.

2. The system of claim 1, wherein the first seat comprises an O-ring disposed at the outer surface of the first seat, the O-ring arranged to form a fluid seal with one of an inner surface of the second seat or a surface of the first annular recess to prevent fluid from flowing in a direction along a width of the first seat.

3. The system of claim 1, wherein the fluid injector is fluidically coupled to the interior channel of the first seat, and wherein the second gap is fluidically coupled to the interior channel of the first seat such that the pressurized fluid flows from the fluid injector through the valve housing to the interior channel, and from the interior channel to the second gap to expand the second gap.

4. The system of claim 3, wherein the second seat comprises a smaller width than the first seat, and wherein the interior channel of the first seat comprises 1) a fluid inlet at the outer surface of the first seat, the fluid inlet fluidically coupled to the fluid injector, 2) a first outlet at the second gap, and 3) a third outlet facing the gate.

5. The system of claim 1, wherein the second annular recess extends radially away from a surface of the first annular recess to define, together with the first annular recess and in cross-section, an M-shaped annular recess.

6. The system of claim 1, wherein the second seat is configured to form the second fluid seal with the gate when fluid leaks at the first seal between the first seat and the gate.

7. The system of claim 1, wherein the second seat comprises an end defining a first chamfered edge and the second annular recess comprises a corresponding second chamfered edge to define, with the first chamfered edge, a V-shaped gap converging away from the interior channel of the first seat, and wherein the V-shaped gap is in fluid communication with the interior channel.

8. The system of claim 1, further comprising a lock pin attached to the valve housing, the lock pin comprising a first end exposed outside the valve housing and a second end configured to engage a recess of the second seat to prevent the second seat from moving toward the gate, the lock pin configured to disengage the second seat as the lock pin moves away from the second seat to allow the second seat to move toward the surface of the gate.

9. The system of claim 1, further comprising:
a third seat similar to the first seat, the third seat disposed at a third annular recess extending from an inner surface of the second tubular body, the third seat facing the first seat and configured to form, with the gate, a third fluid seal between the first tubular body and the second tubular body; and
a fourth seat similar to the second seat, the fourth seat disposed at a fourth annular recess radially larger than the third annular recess, the fourth seat facing the second seat and configured to form, with the gate, a fourth fluid seal between the first tubular body and the second tubular body.

10. The system of claim 1, wherein the first seat comprises a first soft insert disposed within an annular groove of the first seat extending from a surface of the first seat facing the gate, the first soft insert configured to form the first seal with the surface of the gate, and wherein the second seat comprises a second soft insert disposed within an annular groove of the second seat extending from a surface of the second seat facing the gate, the second soft insert configured to form the second seal with the surface of the gate.

11. The system of claim 1, wherein the fluid injector comprises a head adapted to be fluidically coupled to a fluid pump that flows the pressurized fluid to the fluid injector, the fluid injector comprising a check valve configured to prevent backward flow of fluid.

12. The system of claim 1, wherein the gate is configured to move in a direction perpendicular to a longitudinal axis of the tubular bodies to interrupt or allow fluid flow from the first tubular body to the second tubular body.

13. A method of forming a secondary fluid seal in a gate valve, the gate valve comprising a housing comprising a first tubular body and a second tubular body separate from the first tubular body to define a first gap between the first tubular body and the second tubular body, the first tubular body and the second tubular body configured to flow a fluid from a pipe fluidically coupled to the gate valve, the gate valve further comprising a gate configured to move within the first gap to interrupt or allow fluid flow from the first tubular body to the second tubular body, the gate valve further comprising a first seat disposed at a first annular recess extending from an inner surface of the first tubular body and configured to form, with the gate, a first fluid seal between the first tubular body and the second tubular body, the first seat defining an interior channel configured to receive pressurized fluid from a fluid injector coupled to the valve housing, the gate valve further comprising a second seat disposed at a second annular recess radially larger than the first annular recess, the second seat comprising an inner diameter larger than an outer diameter of the first seat and disposed concentrically about an outer surface of the first seat, the second seat defining a second gap with the second annular recess, the second gap configured to receive the pressurized fluid from the interior channel of the first seat to expand the second gap, the method comprising:
determining that fluid leaks, at an interface between the first seat and the gate, from the first tubular body toward the second tubular body; and
actuating the fluid injector to flow pressurized fluid from the fluid injector, through the interior channel of the first seat, to the second gap between the second seat and the second annular recess to expand the second gap and move the second seat toward the surface of the gate to form a fluid seal, under fluidic pressure, between the first tubular body and the second tubular body.

14. The method of claim 13, wherein actuating the fluid injector comprises fluidically connecting the fluid injector to a fluid pump and flowing, from the fluid pump to the fluid injector, the pressurized fluid.

15. The method of claim 13, wherein the gate valve further comprises a lock pin attached to the valve housing, the lock pin comprising a first end exposed outside the valve housing and a second end configured to engage a recess of the second seat to prevent the second seat from moving toward the gate, the lock pin configured to disengage the second seat as the lock pin moves away from the second seat to allow the second seat to move toward the surface of the gate, the method further comprising:
prior to actuating the fluid injector, disengaging the lock to allow the second seat to move toward the gate.

16. A secondary sealing system for a gate valve, the gate valve comprising a housing comprising a first tubular body and a second tubular body separate from the first tubular body to define a first gap between the first tubular body and the second tubular body, the first tubular body and the second tubular body configured to flow a fluid from a pipe fluidically coupled to the gate valve, the gate valve further comprising a gate configured to move within the first gap to interrupt or allow fluid flow from the first tubular body to the second tubular body, the system comprising:
a first seat disposed at a first annular recess extending from an inner surface of the first tubular body, the first seat movable from the recess toward a surface of the gate to form a first fluid seal between the first tubular body and the second tubular body, the first seat defining an interior channel configured to receive pressurized fluid from a fluid injector coupled to the housing; and
a second seat disposed at a second annular recess radially larger than the first annular recess, the second seat comprising an inner diameter larger than an outer diameter of the first seat and disposed concentrically about an outer surface of the first seat, the second seat defining a second gap with the second annular recess, the second gap configured to receive the pressurized fluid from the interior channel of the first seat to expand the second gap, the second seat configured to move toward the surface of the gate to form a second seal with the gate as the pressurized fluid expands the second gap, the second seal configured to prevent fluid from flowing from the first tubular body to the second tubular body.

17. The system of claim 16, wherein the fluid injector is fluidically coupled to the interior channel of the first seat, and wherein the second gap if fluidically coupled to the interior channel of the first seat such that the pressurized fluid flows from the fluid injector through the valve housing to the interior channel, and from the interior channel to the second gap to expand the second gap.

18. The system of claim 16, further comprising a lock pin attached to the valve housing, the lock pin comprising a first end exposed outside the valve housing and a second end configured to engage a recess of the second seat to prevent the second seat from moving toward the gate, the lock pin configured to disengage the second seat as the lock pin moves away from the second seat to allow the second seat to move toward the surface of the gate.

19. The system of claim 16, further comprising:
  a third seat similar to the first seat, the third seat disposed at a third annular recess extending from an inner surface of the second tubular body, the third seat facing the first seat and configured to form a third fluid seal between the first tubular body and the second tubular body; and
  a fourth seat similar to the second seat, the fourth seat disposed at a fourth annular recess radially larger than the third annular recess, the fourth seat facing the second seat and configured to form a fourth fluid seal between the first tubular body and the second tubular body.

20. The system of claim 16, wherein the first seat comprises a first soft insert disposed within an annular groove of the first seat extending from a surface of the first seat facing the gate, the first soft insert configured to form the first seal with the surface of the gate, and wherein the second seat comprises a second soft insert disposed within an annular groove of the second seat extending from a surface of the second seat facing the gate, the second soft insert configured to form the second seal with the surface of the gate.

* * * * *